United States Patent [19]

Watanabe et al.

[11] Patent Number: 5,364,158
[45] Date of Patent: Nov. 15, 1994

[54] IMPACT-SENSOR MOUNTING STRUCTURE FOR AN AUTOMOTIVE VEHICLE

[75] Inventors: Shigeaki Watanabe; Shuichi Nakagami; Yoshie Watanabe; Hidemitsu Yamatoya, all of Hiroshima, Japan

[73] Assignee: Mazda Motor Corporation, Hiroshima, Japan

[21] Appl. No.: 104,939

[22] Filed: Aug. 12, 1993

Related U.S. Application Data

[63] Continuation of Ser. No. 742,382, Aug. 8, 1991, abandoned.

[30] Foreign Application Priority Data

Aug. 9, 1990 [JP] Japan .................. 2-212022
Jan. 30, 1991 [JP] Japan .................. 3-009629
Jul. 12, 1991 [JP] Japan .................. 3-198570

[51] Int. Cl.$^5$ .................. B62D 23/00; B60R 21/16
[52] U.S. Cl. .................. 296/189; 296/188; 293/155; 280/735; 180/282; 200/61.44; 200/61.45 R
[58] Field of Search .................. 296/188, 189, 194; 280/734, 735; 180/274, 282; 200/61.44, 61.45 R; 293/155

[56] References Cited

U.S. PATENT DOCUMENTS

| 3,718,332 | 2/1973 | Jones | 280/735 |
| 3,718,364 | 2/1973 | Fischer et al. | 296/189 |
| 3,853,199 | 12/1974 | Hirashima et al. | 180/274 |
| 3,859,482 | 1/1975 | Matsui et al. | 200/61.08 |
| 3,862,669 | 1/1975 | Lindbert et al. | 180/274 X |
| 3,883,166 | 5/1975 | Cadiou | 296/189 X |
| 3,904,237 | 9/1975 | Barenyi et al. | 296/189 |
| 4,406,343 | 9/1983 | Harasaki | 296/194 X |
| 4,778,208 | 10/1988 | Lehr et al. | 296/189 X |
| 4,819,960 | 4/1989 | Breed | 280/734 |
| 5,118,160 | 6/1992 | Kitagawa et al. | 296/189 |

FOREIGN PATENT DOCUMENTS

| 0292669 | 11/1988 | European Pat. Off. | 280/735 |
| 0449241 | 10/1991 | European Pat. Off. | 296/194 |
| 2210420 | 11/1972 | Germany | 280/735 |

*Primary Examiner*—Dennis H. Pedder
*Attorney, Agent, or Firm*—Fish & Richardson

[57] ABSTRACT

The impact sensor is mounted to the front portion of the vehicle body to operate at a high degree of responsiveness. The impact load is entered into the front frame to the bumper in such a manner that the input point of input of the impact load is offset by a given distance upwards above the vertically central line of the front frame. To a lower front end portion of the front frame is joined the cross member so as to make rigidity at the upper portion of the front frame equal to that at the lower portion thereof. The impact sensor is mounted to the front frame in such a forwards inclined state with respect to the horizontal direction of the vehicle body that the direction of the impact sensor in which the impact of the crash is sensed approaches the horizontal direction.

4 Claims, 12 Drawing Sheets

IMPACT-SENSOR MOUNTING STRUCTURE FOR AN AUTOMOTIVE VEHICLE

This application is a continuation of U.S. application Ser. No. 07/742,382, filed Aug. 8, 1991, now abandoned.

BACKGROUND OF THE INVENTION

1. Field of the Invention

The present invention relates to an impact-sensor mounting structure for an automotive vehicle and, more particularly, to a structure for mounting an impact sensor at a front portion of a vehicle body for sensing a crash of the automotive vehicle with a desired degree of responsiveness.

2. Description of the Related Art

Recent years, there is the growing tendency that an air bag system is loaded in automotive vehicles as one of security measures. The air bag system is so arranged as to absorb a crash energy acting upon the passenger or passengers by expanding the air bag upon crash of the automotive vehicle. Hence, it is essential to mount a sensor capable of sensing a crash of the automotive vehicle with high accuracy while securing a desired degree of responsiveness.

For conventional air bag systems, it is general that the sensor system comprises a plurality of front sensors mounted in a so-called crash zone at the front portion of the vehicle body and one cowl sensor mounted to a cowl panel, etc. within the vehicle compartment. This sensor system is generally arranged in such a fashion that the cowl sensor is set to be highly sensitive while the front sensors are set to be less sensitive in order to prevent them from sensing too sensitive. Further, the air bag system is provided with an AND circuit so arranged as to accept two signals indicative of a car crash from at least one of the front sensors and the cowl sensor and generate a signal for expanding the air bag.

Accordingly, it is extremely significant in expanding the air bag upon crash of a car how accurate the impact sensor system can sense the car crash, i.e. how accurate the impact sensor system can respond to the impact of the crash of the vehicle body.

Description will now be made of a representative example of an impact sensor 10 of a mass damping type with reference to FIG. 17. As shown in FIG. 17, reference numeral 10a denotes a sensing mass (a ball) made of a conductive material capable of sensing upon crash, reference numeral 10b stands for a cylinder defining a passage for the sensing mass 10a, reference numeral 10c denotes a terminal so arranged as to apply electricity as the sensing mass 10a rolls to come into abutment with the sensing mass 10a, and reference numeral 10d denotes a magnet so arranged as to hold the sensing mass 10a at the end portion of the cylinder 10b under normal circumstances. It is to be noted herein that the responsiveness of the sensor system depends upon a roll of the sensing mass 10a. In order to improve the responsiveness of the sensor system, it may be understood that the axial direction of the sensing mass 10a is so arranged as to be perpendicular to a crash object, i.e. the direction in which the sensor system senses the crash is so set as to be horizontal with respect to the vehicle body.

However, the front sensors of the conventional sensor system mounted at the front portion of the vehicle body cannot achieve high responsiveness particularly when the vehicle body is broken in the front portion thereof upon a crash and the directional property of the vehicle body is lost as the result of a deformation of the vehicle body.

In order to solve this disadvantage, Japanese Patent Laid-open Publication (kokai) No. 50(1985)-141,045 discloses an impact sensor arranged so as to gain a constant degree of responsiveness within a particular range of angles by adapting the direction of sensing a crash by the impact sensor to the direction in which acceleration is caused to occur at a particular range of the angles due to the crash and by operating an equal degree of acceleration at any angle. Further, Japanese Utility Model Laid-open Publication (kokai) No. 2(1990)-10,159 discloses an impact sensor system whose forward mounting section is set to be more rigid than its rearward mounting section with the attempt to lose no directional property of the sensor itself even due to the deformation of the front portion of a front frame of the vehicle body upon a car crash, thereby avoiding a decrease in responsiveness. Furthermore, Japanese Patent Laid-open Publication (kokai) No. 63(1988)-291,752 discloses an impact sensor which is mounted to the vehicle body in such a state that it descends forwards, thereby taking advantage of a vertical component of acceleration, which is caused to occur upon a severe crash, as well as a horizontal component of acceleration, in order to react against a crash with high sensitivity.

The impact sensor disclosed in Japanese Patent Laid-open Publication No. 50-141,045 is so complex in structure that its production costs become too expensive and the impact sensor itself is pivotally disposed to sense an impact from a certain range of directions so that a wide space is required to cover the certain range of the directions.

On the other hand, the impact sensor disclosed in Japanese Utility Model Laid-open Publication (kokai) No. 2-10,159 is said to be effective when a front frame of the vehicle body is compressed and crashed in the axial direction thereof, however, it does not present the great advantages if the front frame thereof would be compressed and deformed in an upward or downward direction as the result of a crash.

Further, the impact sensor disclosed in the Japanese Patent Laid-open Publication No. 63-291,752 is mounted to the vehicle body in a forwards descending manner in order to take advantage of the vertical component of acceleration. This prior patent publication is silent about an influence of deformation of the frame due to a car crash upon responsiveness of the impact sensor, so that it neither discloses nor implies whatsoever any idea of improving responsiveness of the impact sensor by paying attention to the deformation of the frame or the direction of input of external force upon crash of the vehicle body.

SUMMARY OF THE INVENTION

Therefore, the object of the present invention is to provide a structure of mounting an impact sensor for an automotive vehicle so adapted as to operate the impact sensor to achieve a desired degree of responsiveness upon a crash of the vehicle body without changing the structure of the impact sensor itself.

In order to achieve the aforesaid object, the present invention in a first aspect consists of an impact-sensor mounting structure for an automotive vehicle in which an impact sensor is so mounted to a front end portion of a front frame to a front end of which a bumper is mounted as to extend in a longitudinal direction of a vehicle body, wherein:

rigidity at an upper portion of the vehicle body above an input point of input of an impact load to be entered into the front frame from the bumper is set to be substantially identical to rigidity at a lower portion thereof below the input point of input thereof; and the impact sensor is mounted to the front frame so as to allow its direction of sensing an impact of a crash to become substantially horizontal.

In another aspect, the present invention consists of an impact-sensor mounting structure for the automotive vehicle in which an impact sensor is so mounted to a front end portion of a front frame to a front end of which a bumper is mounted as to extend in a longitudinal direction of the vehicle body, wherein:

the front frame has a characteristic of being curved and deformed at an initial stage of a crash in an upward or downward direction with respect to an input point of the impact load to be entered into the front frame from the bumper; and the impact sensor is so mounted to the front frame as to allow a direction of the impact sensor in which the impact of the crash is sensed to descend forwards with respect to a horizontal line, when the front frame has the characteristic of curving and deforming in an upward direction due to the impact of the crash, while the impact sensor is so mounted to the front frame as to allow the direction of the impact sensor in which the impact of the crash is sensed to ascend forwards with respect to the horizontal line, when the front frame has the characteristic of curving and deforming in a downward direction due to the impact of the crash.

In a further aspect, the present invention consists of a impact-sensor mounting structure for an automotive vehicle in which an impact sensor for sensing an impact of a crash of its vehicle body is mounted to a front portion of the vehicle body, wherein:

the front portion of the vehicle body comprises a front frame extending in a longitudinal direction of the vehicle body, a shroud panel extending in a transverse direction thereof, and a connecting panel connecting the front frame to the shroud panel;

wherein a front end portion of the front frame projects forwards from the shroud panel to thereby allow a front end thereof to form a mounting face for mounting the bumper; and the connecting panel is provided with a front end wall section which abuts with the mounting face of the front frame and which is interposed between the mounting face thereof and the bumper, so as to disperse a portion of the impact load to be entered into the front frame from the bumper to thereby control deformation as a result of curvature in an upward or downward direction to be caused by the crash; and the impact sensor is mounted to the front frame or the connecting panel so as to allow the direction of the impact sensor in which the impact of the crash is sensed to become substantially horizontal.

In the first aspect of the present invention, the rigidity at the upper portion of the front frame above the input point of input of the impact load to be entered into the front frame from the bumper is so set as to become substantially equal to the rigidity at the lower portion thereof under the input point thereof, so that the front end portion of the front frame is compressed and crashed in the axial direction of the vehicle body without substantial deformation and curvature in an upward or downward direction. Hence, the impact-sensor mounting structure according to the present invention has the impact sensor mounted to the front frame so as for its direction of sensing the impact of the crash to be set substantially horizontal, so that the impact sensor can maintain its state to detect the impact of the crash in a substantially horizontal direction, thereby securing responsiveness of the impact sensor to a desired extent.

In another aspect of the present invention as described hereinabove, the front frame has the characteristic such that it is curved and deformed in an upward or downward direction due to the impact of the crash in its initial stage, so that the impact sensor is so mounted to the front frame as to assume a state in which it is inclined in the direction opposite to the direction in which the front frame is curved and deformed due to the impact of the crash, thereby allowing the impact sensor to approach its direction of sensing the impact of the crash toward a horizontal direction as a result of curvature of the front frame at an initial stage of the crash. More specifically, for instance, when the front frame has the characteristic that its front end portion is curved and deformed upwards upon a crash of the vehicle body, the impact sensor is mounted to the front frame in a forwards descending manner so that the impact sensor is brought into a substantially horizontal state as a result of the fact that the front frame is caused to be curved and deformed in the upward direction of the vehicle body upon the crash. Hence, the impact sensor can secure a desired extent of responsiveness by taking advantage of the behavior of the front frame at the initial stage of the crash.

In the third aspect of the present invention, the impact sensor is mounted to the front frame or to the connecting panel in such a manner that the direction in which the impact sensor senses the impact of the crash is substantially horizontal, so that the horizontal state of the impact sensor may be maintained at an initial stage of the crash because the curvature and deformation of the front frame in an upward or downward direction is suppressed upon the crash by connecting the front frame to the shroud panel through the connecting panel. Hence, in the third aspect of the present invention, the impact sensor Can ensure a desired extent of responsiveness at the time of a crash.

Other objects, features and advantages of the present invention will become apparent in the course of the description of the preferred embodiments, which follows, with reference to the accompanying drawings.

DETAILED DESCRIPTION OF THE PREFERRED EMBODIMENTS

First Embodiment (FIGS. 1–4)

Figure 1:
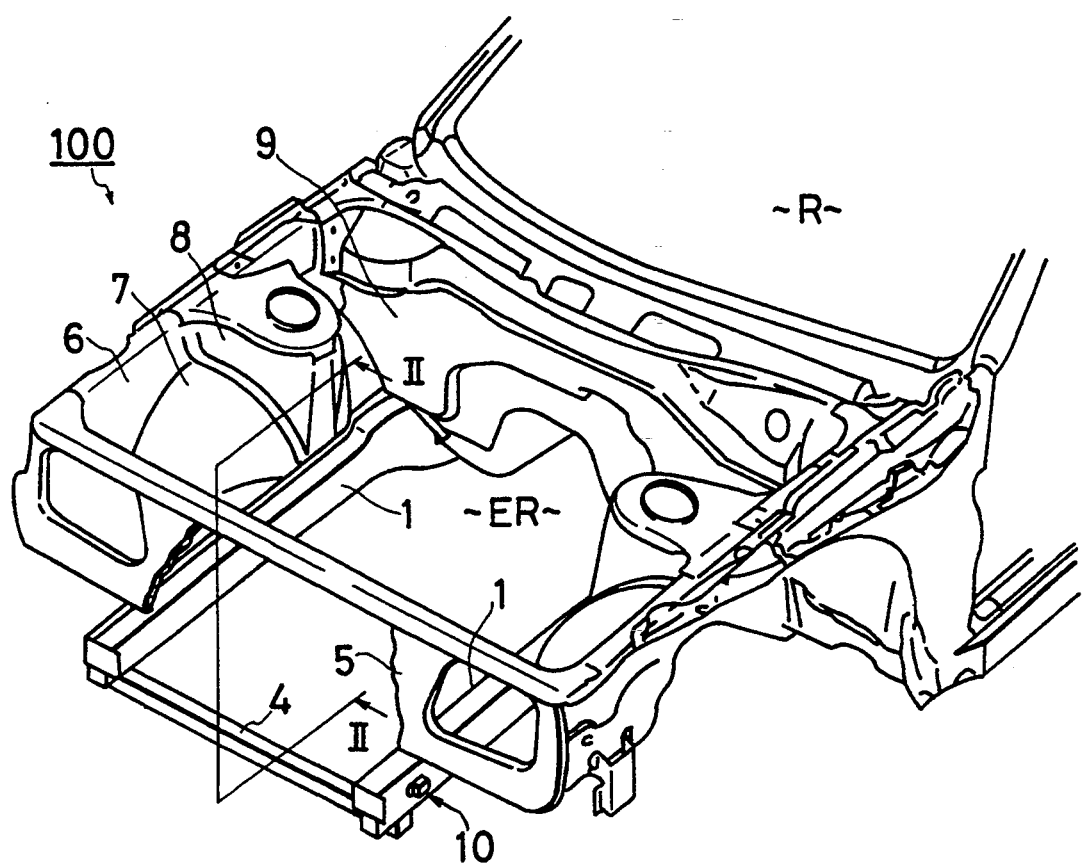
FIG. 1 is a perspective view showing the front portion of a vehicle body to which the present invention is applied.
Figure 2:
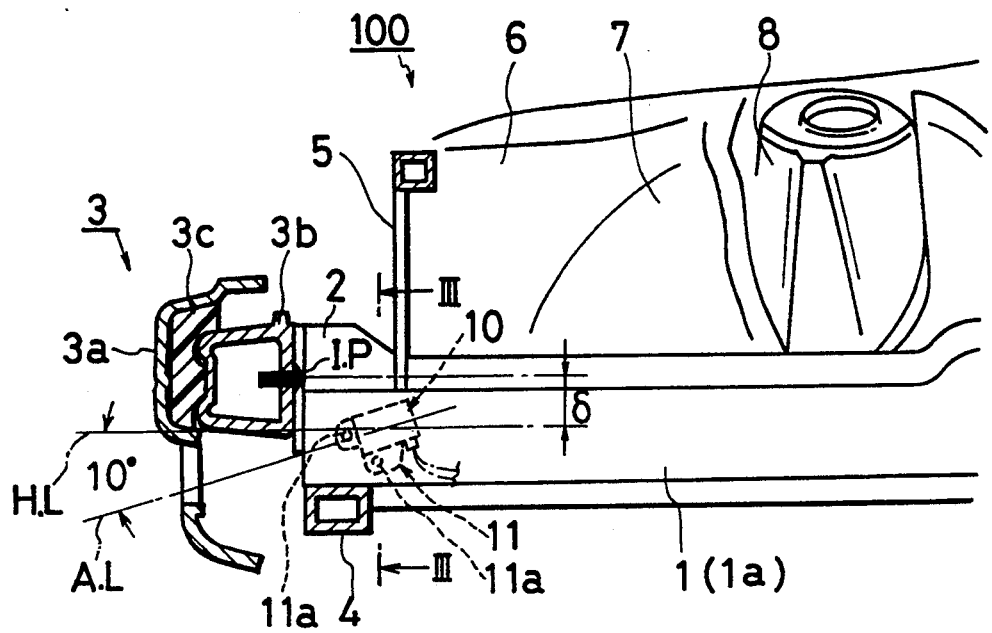
FIG. 2 is a sectional view taken along line II—II of FIG. 1.
Figure 3:
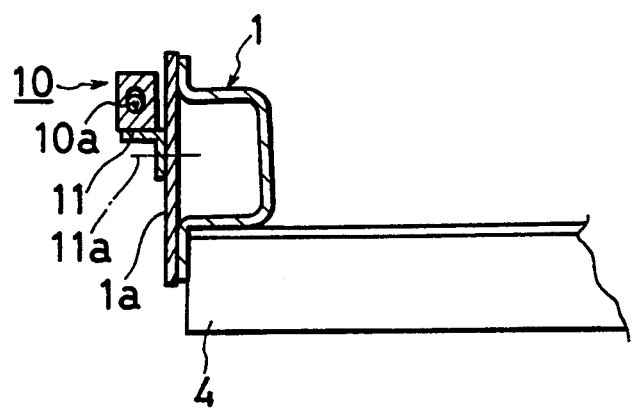
FIG. 3 is a sectional view taken along line III—III of FIG. 2.

FIG. 1 is a perspective view showing a front portion of the vehicle body to which the impact-sensor mounting structure according to the embodiment of the present invention is applied. FIG. 2 is a sectional view of the front portion of the vehicle body, when taken along line II—II of FIG. 1. FIG. 3 is a sectional view of the front portion of the vehicle body, when taken along line III—III of FIG. 2.

The front portion 100 has a pair of left-hand and right-hand front frames 1 extending in a longitudinal direction of the vehicle body and a bumper 3 is mounted through a stay 2 to a front end face of each of the front frames 1. The bumper 3 comprises a bumper face 3a, a bumper lane 3b and a buffer member 3c. Between the left-hand and right-hand front frames 1 is interposed a cross member 4 which in turn is connected to a bottom face of each of the front frames 1.

To the front end portion of each front frame 1 is connected a shroud panel 5 which in turn is disposed in the transverse direction of the vehicle body and constitutes a front wall of an engine room ER. The engine room ER has each of its side walls comprised of a wheel apron 6 which extends from the corresponding shroud panel 5 toward the rear portion of the engine room ER and whose lower end is connected to the corresponding front frame 1. The wheel apron 6 is provided with a wheel housing 7 projecting toward the inside of the engine room ER and a suspension tower 8 for supporting a suspension damper (not shown).

To an upper face of the rear end portion of the front frame 1 is connected a dash panel 9 which in turn extends over the entire width of the vehicle body as well as defines and divides the engine room ER from the vehicle compartment. In other words, the dash panel 9 constitutes a rear wall of the engine room ER.

The front portion 100 of the vehicle body is provided with a front sensor (an impact sensor) 10 constituting the impact sensor system of an air bag system. More specifically, the front sensor 10 is of a mass damping type and is mounted to a side face of the front frame 1 at its front end portion on the external side of the vehicle body. It is noted herein that a conventional air bag to which the impact-sensor mounting structure according to the present invention is applied may be employed for the automotive vehicle, so that description and drawing thereof are omitted herefrom for brevity of explanation.

Description will now be made of a specific way of mounting the front sensor 10. As shown in FIG. 2, the front sensor 10 is bolted through a bracket 11 to a central portion of an outer front frame 1a and the bracket 11 is bolted with a bolt 11a. The front sensor 10 is mounted to the outer front frame 1a at an angle of approximately 10° with respect to the horizontal line H.L. More specifically, the front sensor 10 is mounted in such an inclined manner that its front end is lower than its rear end and the axial line A. L of the cylinder 10b intersects the horizontal line H. L at the angle of approximately 10°. In other words, the direction in which the front sensor 10 senses the impact of the crash is inclined forwards at the angle of approximately 10°.

It is to be noted herein that, as will be apparent from FIG. 2, the reason for mounting the front sensor 10 in the manner as inclined forwards at the angle of approximately 10° is because the front sensor 10 is caused to direct upwards due to the impact resulting from the crash and consequently it can sense the impact of the crash in the horizontal direction due to the fact that the front frame 1 is curved and deformed in its upward direction in the initial stage of the crash. This is caused to happen because the rigidity of the front frame 1 at its upper portion is weaker relative to the rigidity thereof at its lower portion due to the fact that the input point I.P of external force from the bumper 3, i.e. the central point of the bumper lane 3b, is offset in an upward direction with the central point of the front frame 1 and further that the cross member 4 connecting the left-hand and right-hand front frames 1 to each other is connected to the bottom face of the front frame 1 at its front end portion, thereby making the rigidity of the lower portion of the front frame 1 larger than that of the upper portion thereof.

It is noted herein that the front frame 1 is caused to be curved and deformed in the upward direction in the initial stage of the crash and thereafter it is compressed and deformed in its axial direction.

The terms "direction of sensing the impact of a crash in a horizontal direction" and relating terms are intended herein to mean the direction in which the sensing mass 10 disposed within the impact sensor 10a rolls over, i.e. the direction in which the axial line A.L of the cylinder 10b disposed within the impact sensor 10a extends. In the drawings which follow, the direction in which the impact resulting from the crash is sensed is indicated by the arrow A.L as needed.

In this embodiment, the front sensor 10 is mounted in the forwards inclined manner because the direction of sensing the impact of the crash is set extending within the inside of the impact sensor 10 in the direction parallel to the direction in which a casing of the impact sensor 10 extends longitudinally. It can be noted, however, that the front sensor 10 may be mounted in the horizontal direction with respect to the vehicle body if the front sensor 10 is so arranged as for its direction of sensing the impact of the crash to be set in such a manner as inclined forwards at approximately 10° and as to achieve substantially the same effects as the front sensor 10 that is mounted to the front frame 10 in its forwards inclined arrangement at the angle of approximately 10°.

That the direction of sensing the impact of the crash is kept horizontal upon the crash leads to improvements in responsiveness will be described with reference to the time chart as indicated by reference symbols A and B in FIG. 4.

Figure 4:
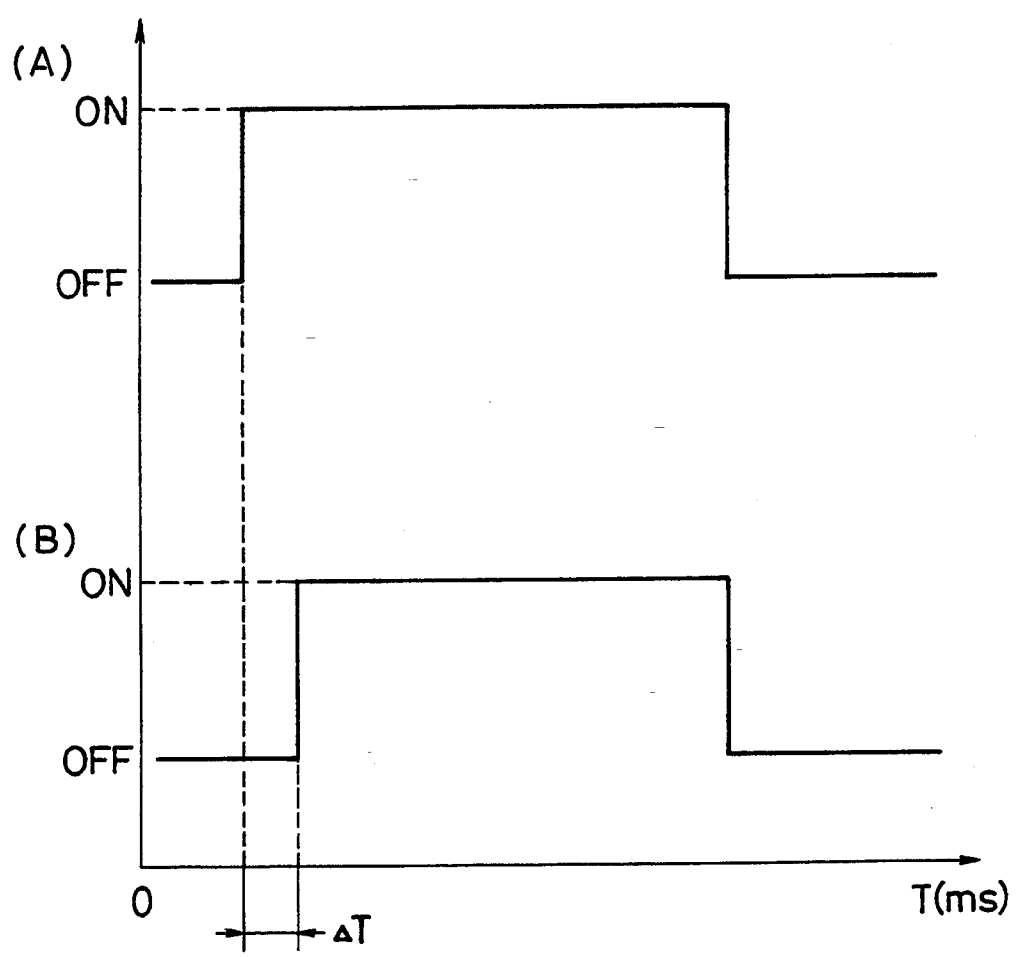
FIG. 4A is a time chart showing responsiveness of the impact sensor to be attained by the front portion of the vehicle body to which a first embodiment of the present invention is applied.
FIG. 4B is a time chart showing responsiveness of the impact sensor to be attained by a conventional impact sensor disposed in a conventional and horizontal way at the front portion of the vehicle body which is arranged in substantially the same manner as in the first embodiment of the present invention.

The reference symbol A in FIG. 4 shows the time chart indicating the sensing time of the impact sensor that is mounted to set the direction A.L of sensing the impact at the angle of approximately 10° at which the impact sensor is inclined forwards. On the other hand, the reference symbol B in FIG. 4 shows the time chart indicating the sensing time of the impact sensor having the same structure as in this embodiment, that is mounted in the horizontal direction as in conventional manner, i.e. in such a fashion that the direction A.L of the impact sensor 10 in sensing the impact of the crash is set parallel to the longitudinally horizontal line of the vehicle body. In each of the graphs, the vertical axis indicates the sensing state, while the horizontal axis indicates the period of time expressed in ms.

As is apparent from FIG. 4, it is noted that the impact sensor 10 mounted in the conventional way, as indicated by the reference symbol B, delays sensing the impact resulting from the crash by the period of time, AT, from the time when the impact sensor 10 mounted in the manner as in this embodiment of the present invention, as indicated by the reference symbol A in FIG. 4. This means that, from the point of view of the structure of the front portion 100 of the vehicle body, the front end portion of the front frame 1 is caused to be curved and deformed in the upward direction at the initial stage of the crash so that the direction A.L of sensing the impact of the crash by the impact sensor 10 mounted in the manner as in the embodiment of the present invention is allowed to approach to the horizontal line H.L as the front end portion of the front frame 10 is caused to be curved upwards at the initial stage of the crash, i.e. that the direction A.L of sensing the impact is changed so as to achieve the desired extent of sensitivity. On the other hand, for the impact sensor 10 mounted in the conventional manner, the direction A.L of sensing the impact resulting from the crash is caused to be remote from the horizontal line H.L, i.e. the direction A.L is changed so as to make the sensitivity to the impact less sensitive.

It is further to be noted that, in the first embodiment as described hereinabove, the angle at which the impact sensor is inclined forwards is set to approximately 10° as a result of experiments, however, the angle at which the impact sensor 10 is arranged for its direction A.L for sensing the impact of the crash to be set substantially horizontal upon the crash is not restricted to the 10° angle and may vary with models of the automotive vehicle, such as the input point of external force from the bumper 3 upon the crash, the difference in rigidity between the upper and lower portions of the front frame 10, etc. In other words, if the rigidity of the front frame 1 at its upper portion is weaker than that as described hereinabove, then the impact sensor 10 may be mounted at the angle at which the impact sensor 10 is inclined forwards greater than the 10° angle. On the contrary, the impact sensor 10 may be inclined forwards at the angle smaller than the 10° angle.

Figure 5:
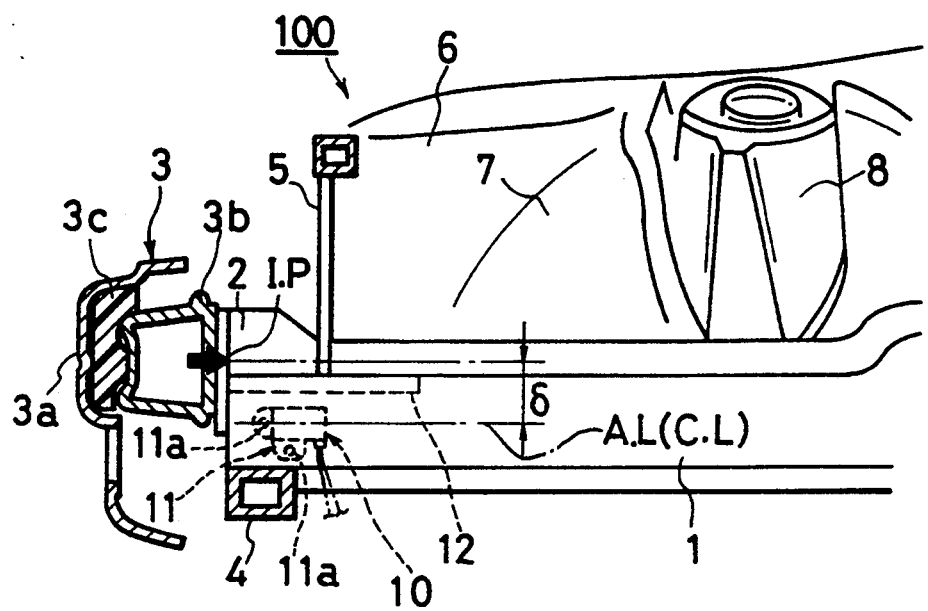
FIG. 5 is a side view showing the front portion of the vehicle body to which a second embodiment of the present invention is applied.

The drawings in FIG. 5 and thereafter show additional embodiments of the present invention, and the identical elements are provided with the identical reference numerals and symbols so that description of the identical elements will be omitted from the following description for brevity of explanation.

Second Embodiment (FIG. 5)

The front portion 100 of the vehicle body in this embodiment has basically the same structure as that in the first embodiment of the present invention as described hereinabove. In other words, the cross member 4 is joined to the bottom face of the front frame 1 and the input point I.P of the impact resulting from the crash is offset upwards by the distance, δ, with respect to the vertically central line C.L (the horizontal line H.L, too) of the front frame 1. Hence, the front end portion of the front frame 1 is caused to be curved and deformed toward the upward direction in the initial stage of the crash.

For the front portion 100 of the vehicle body in this embodiment, a reinforcing plate 12 is joined to an upper front end portion of the front frame 1, i.e. to an inner face of the upper wall of the front frame 1 in a sectionally closed structure, and this reinforcing plate 12 serves as suppressing the front end portion of the front frame 1 from curving in the upward direction in the initial stage of the crash. In other words, the front portion 100 of the vehicle body in this embodiment according to the present invention is arranged that the front frame 1 is caused to be compressed and deformed in its axial direction without causing any substantial curvature in the upward or downward direction due to the reinforcement by the reinforcing plate 12. Hence, in this case, the impact sensor 10 is so mounted as for its sensing direction A.L to be arranged in or along the central line C.L (i.e. the horizontal line H.L) of the front frame 10.

With the arrangement of the impact sensor in this embodiment as described hereinabove, the impact sensor 10 disposed in or along the horizontal line H.L of the vehicle body is allowed for its sensing direction A.L to be maintained in the horizontal direction even prior to or subsequent to the crash, thereby permitting a desired extent of responsiveness to be attained.

Figure 6:
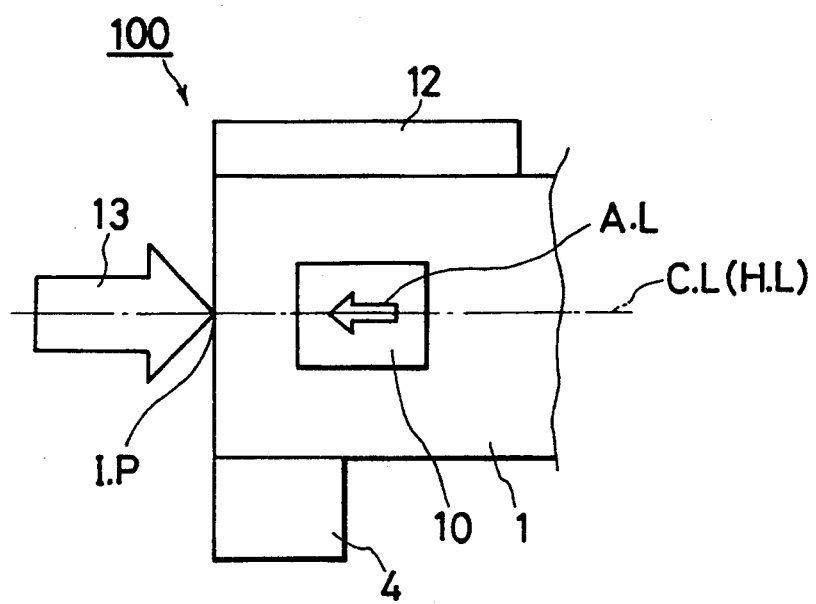
FIG. 6 is a schematic side view showing the front portion of the vehicle body to which a third embodiment of the present invention is applied.

Third Embodiment (FIG. 6)

In FIG. 6, the arrow 13 is intended to mean the input point of input of the external force from the bumper 3, i.e. the input point I.P of input of the impact load resulting from the crash toward the front frame 1.

In this embodiment, the input point I.P of input of the impact resulting from the crash is not offset with respect to the vertically central line C.L of the front frame 1, however, the cross member 4 is disposed at the lower front end portion of the front frame 1 and a reinforcing member, such as the reinforcing plate 12 or the like, is joined to the upper front end portion of the front frame 1. This arrangement permits the front frame 1 to be crashed in its axial direction without causing upward deformation as a result of curvature toward the upward or downward direction due to the crash and enables the sensing direction A.L of the impact sensor 10 to be kept substantially horizontal upon the crash, in substantially the same manner as in the second embodiment of the present invention as described hereinabove.

In this third embodiment, the front portion of the front frame 1 may be constructed such that the cross member 4 is disposed at the upper portion of the front frame 1 while the reinforcing member 12 is disposed at the lower portion thereof. In this case, too, the same effect as described hereinabove can be achieved.

Figure 7:
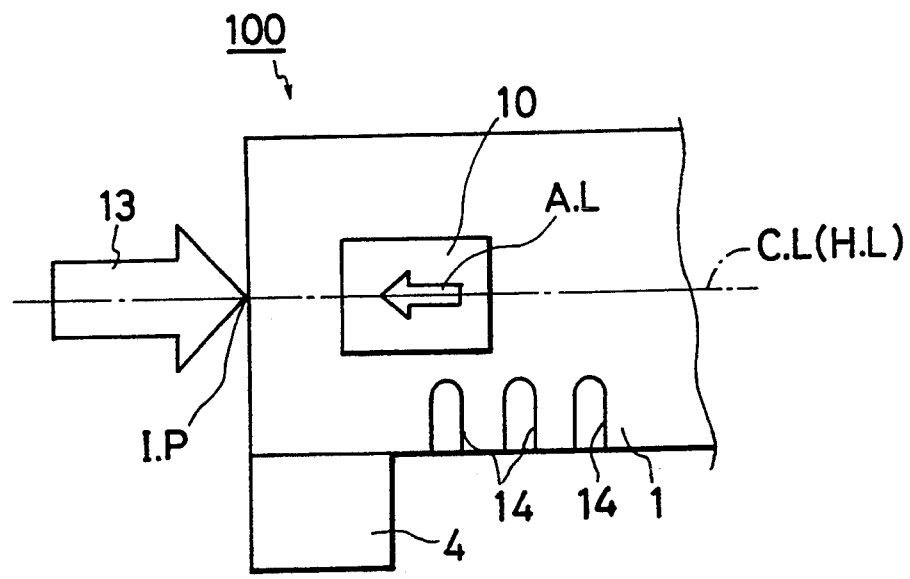
FIG. 7 is a schematic side view showing the front portion of the vehicle body to which a fourth embodiment of the present invention is applied.

Fourth Embodiment (FIG. 7)

For the front portion 100 of the vehicle body as adopted in this fourth embodiment according to the present invention, a plurality of concave beads 14 are disposed at a position behind the cross member 4 mounted to the lower front portion of the front frame 1, in place of the reinforcing plate 12 used in the third embodiment of the present invention. The beads 14 are disposed on the both side walls of the front frame 1 and formed each in a concave shape extending upwards, thereby decreasing the strength of the front frame 1 at its lower portion in the longitudinal direction of the vehicle body so as to keep balance in rigidity between the upper and lower portions of the front frame 1. In this case, the front frame 1 is caused to be crashed and deformed in its axial direction and the impact sensor 10 can maintain its sensing direction A.L to be substantially horizontal upon the crash in substantially the same manner as in the second embodiment according to the present invention.

In this embodiment, the front frame 1 may be constructed in the manner opposite to the disposition of the plural beads 14 as in the fourth embodiment described immediately hereinabove, i.e. the disposition of the beads 14 at the upper portion of the front frame 1, to thereby reduce the strength at the upper portion of the front frame 1. This arrangement can achieve the same effect as the arrangement for the beads to be disposed at the lower portion of the front frame 1 as in the first part of the fourth embodiment as described immediately hereinabove. This embodiment can likewise achieve the same effects.

Figure 8:
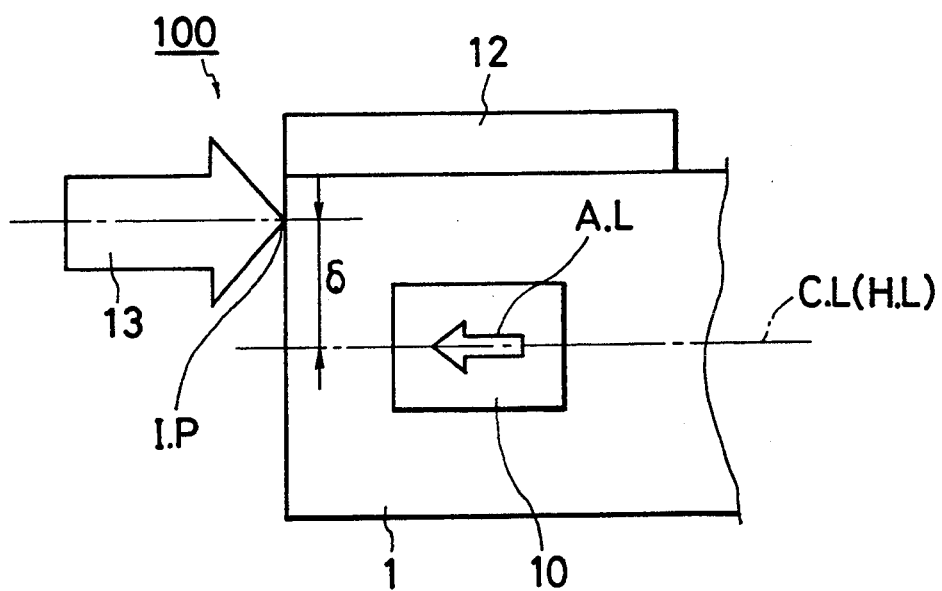
FIG. 8 is a schematic side view showing the front portion of the vehicle body to which a fifth embodiment of the present invention is applied.

Fifth Embodiment (FIG. 8)

It is to be noted that, if the impact is caused to occur due to the crash in the position above the vertically central line C.L of the front frame 1, i.e. in the position remote by the distance, 6, from the central line C.L thereof, when the rigidity of the front frame 1 is equally set between its upper and lower portions, the front portion of the front frame 1 is caused to be curved and deformed in the upward direction upon the crash. Accordingly, the sensing direction A.L of the impact sensor 10 is caused to direct toward the upward direction, too, as the front portion of the front frame 1 is crashed upwards, when the impact sensor 10 is mounted in the horizontal position relative to the vehicle body.

Hence, in the structure of the front portion 100 of the vehicle body as adopted in this fifth embodiment according to the present invention, a reinforcing plate 12 or any other reinforcing member is fixed at the upper front end portion of the front frame 1 to thereby reinforce the rigidity at the upper front end portion of the front frame 1 and suppress the front frame 1 at its front end portion from curving and deforming in its upward direction. This structure of the front frame 1 is crashed and deformed in its axial direction without any substantial deformation in the upward and downward directions in substantially the same manner as in the second embodiment according to the present invention as described hereinabove and the impact sensor 10 can be operated so as to sense the impact of the crash in its horizontal direction. In other words, by reinforcing the rigidity at the upper portion of the front frame 1 by the disposition of the reinforcing member 12 at the upper portion thereof, the impact resulting from the crash is offset by the distance, δ, with respect to the vertically central line C.L of the front frame 1 even if the force of impact is entered in the position remote by the distance δ from the vertically central line C.L thereof, thereby allowing the impact sensor 10 to keep its horizontally sensing direction A.L upon the crash.

In this embodiment, like in the other embodiments, the input point I.P of input of the impact resulting from the crash may be set at the lower portion of the front frame 1, opposite to this fifth embodiment as described immediately hereinabove, i.e. the input point I.P is offset downwards by the distance δ with respect to the center line C.L of the front frame 1. In this case, the reinforcing plate 12 or other reinforcing member may be disposed at the lower portion of the front frame 1, in the manner opposite to the fifth embodiment as described immediately hereinabove. This embodiment can achieve the same effects as in the previous part of fifth embodiment as described hereinabove.

Figure 9:
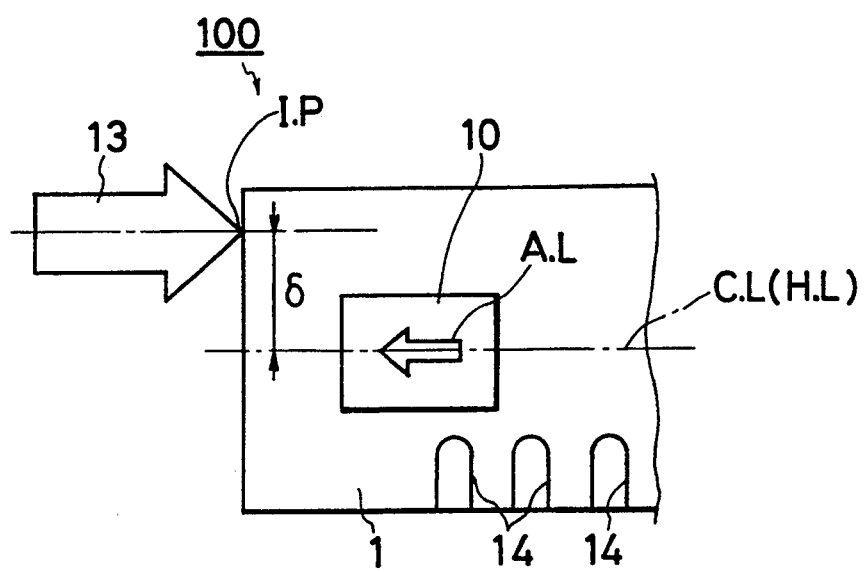
FIG. 9 is a schematic side view showing the front portion of the vehicle body to which a sixth embodiment of the present invention is applied.

Sixth Embodiment (FIG. 9)

In this embodiment, in place of the reinforcing plate 12 as employed in the fifth embodiment as described hereinabove, there may be disposed, as means for slightly reducing rigidity of the front frame 1, a plurality of concave beads 14, as disposed in the fourth embodiment as described hereinabove, are disposed at the lower portion of the front frame 1, thereby reducing the rigidity at the lower portion of the front frame 1 in its longitudinal direction to a slight extent and causing the front portion of the front frame 1 to be crashed and deformed in its axial direction. In other words, the input point I.P of input of the impact resulting from the crash is offset upwards by the distance δ with respect to the central line C.L so that this arrangement enables the impact sensor 10 to keep a horizontally sensing direction A.L.

In this embodiment, too, the concave beads 14 may be disposed at the upper portion of the front frame 1 as the means for slightly reducing rigidity of the front frame, thereby reducing the rigidity at the upper portion of the front frame 1 to a slight extent and allowing the impact sensor 10 to sense its direction A.L at a horizontal level in the manner opposite to the arrangement in the sixth embodiment as described immediately hereinabove. This embodiment can achieve the same effects as in the first part of the sixth embodiment as described hereinabove.

Figure 10:
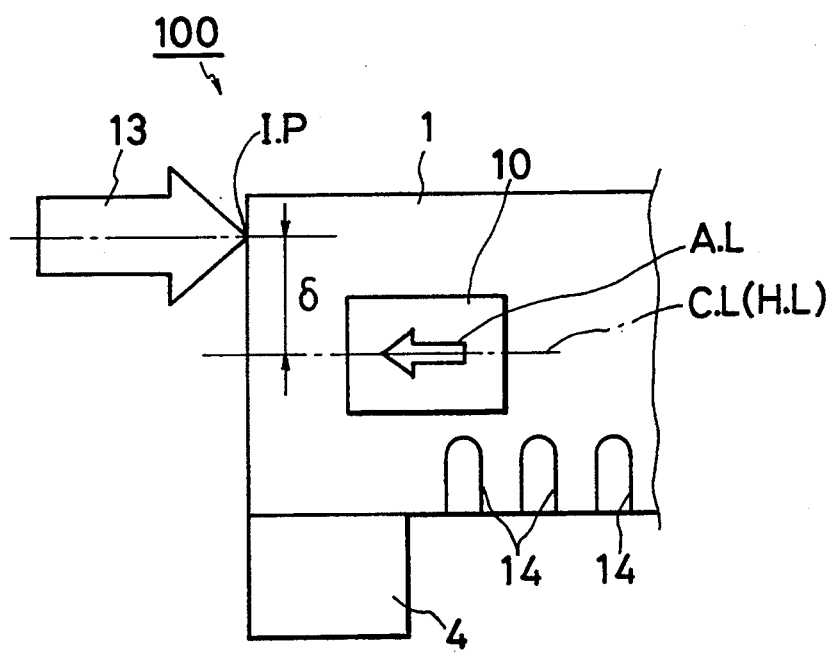
FIG. 10 is a schematic side view showing the front portion of the vehicle body to which a seventh embodiment of the present invention is applied.

Seventh Embodiment (FIG. 10)

In this embodiment, there is employed the front portion 100 of the vehicle body as employed in the second embodiment above in which, in place of the reinforcing plate 12, a plurality of the beads 14 as disposed in the position behind the cross member 4 disposed at the lower front end portion of the front frame 1, thereby reducing the rigidity at the lower portion of the front frame 1 and deforming the front frame 1 in its parallel axial direction upon the crash. This allows the impact sensor 10 to keep its sensing direction A. L in a substantially horizontal fashion when the front frame 1 is caused to be crashed and deformed in its axial direction as a result of the crash.

In this embodiment, too, the plural beads 14 may be disposed in the manner opposite to the arrangement of the plural beads 14 in this seventh embodiment as described hereinabove. In this case, the same effects can be achieved by this embodiment as described in the first part of this seventh embodiment.

Figure 11:
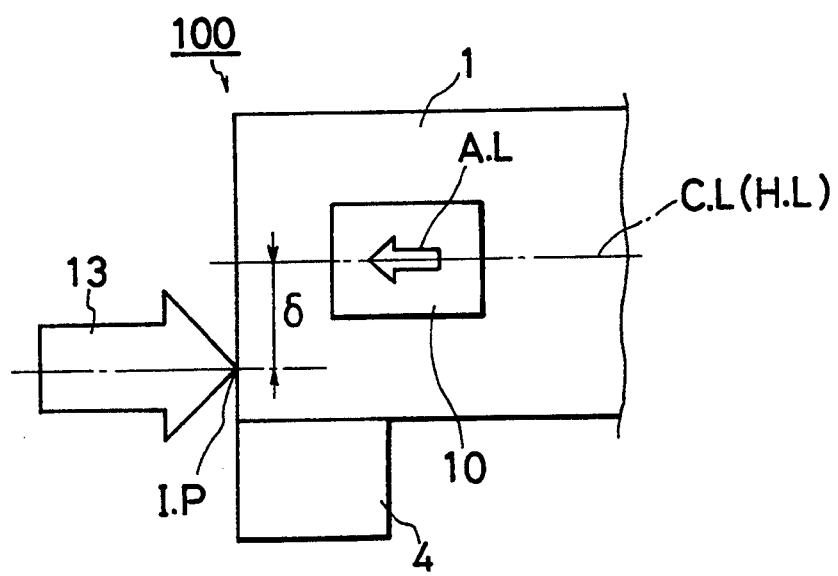
FIG. 11 is a schematic side view showing the front portion of the vehicle body to which an eighth embodiment of the present invention is applied.

Eighth Embodiment (FIG. 11)

In this embodiment, the cross member 4 is disposed at the lower front end portion of the front frame 1 so as to raise the rigidity at its lower portion to an extent higher than at its upper portion and, as a consequence, to set the input point of input of the external force from the bumper 3 resulting from the crash, i.e. the input point I.P of input of the impact of the crash, to a lower portion of the front frame 1. In other words, the input point I.P of the input of the impact resulting from the crash is offset downwards by the distance $\delta$ with the central line C.L of the front frame 1. This arrangement causes the front frame 1 to be crashed and deformed in its axial direction in substantially the same manner as in the second embodiment as described hereinabove and allows the impact sensor 10 to sense the direction A.L for sensing the input of the impact of the crash in a substantially horizontal direction.

In the eighth embodiment, the cross member 4 may be disposed at the upper front end portion of the front frame 1 to thereby elevate the rigidity at the upper portion of the front frame 1 to a level higher than that at the lower portion thereof, in the manner opposite to the eighth embodiment as described immediately hereinabove. This arrangement can likewise achieve the same effect.

Figure 12:
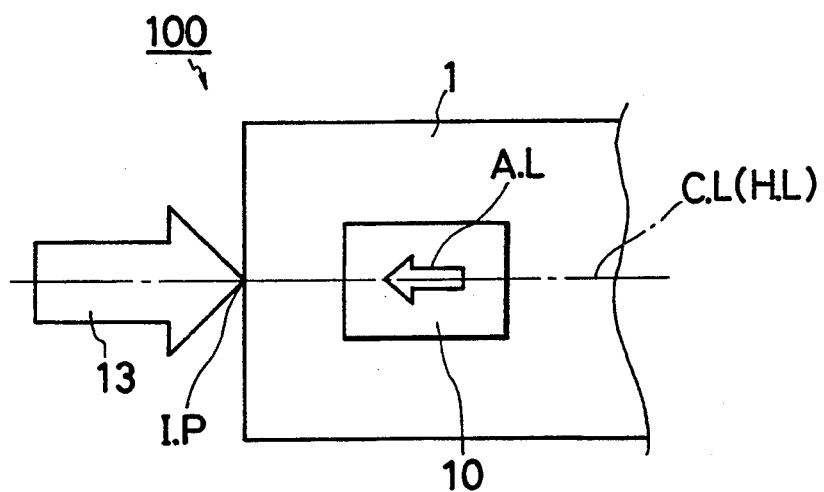
FIG. 12 is a schematic side view showing the front portion of the vehicle body to which a ninth embodiment of the present invention is applied.

Ninth Embodiment (FIG. 12)

The front portion 100 of the vehicle body according to the ninth embodiment of the present invention has no difference in rigidity between at its upper and lower portions from the central line C.L of the front frame 1, so that the front portion of the front frame 1 is crashed and deformed in its axial direction without causing the front portion of the front frame 1 to be curved and deformed in an upward direction or in a downward direction. Hence, the impact sensor 10 is mounted to the front frame 1 so as to allow the input point I.P of input of the impact of the crash to agree with the central line H.L of the front frame 1. This arrangement allows the impact sensor 10 to keep its sensing direction in a horizontal state upon the crash.

Figure 13:
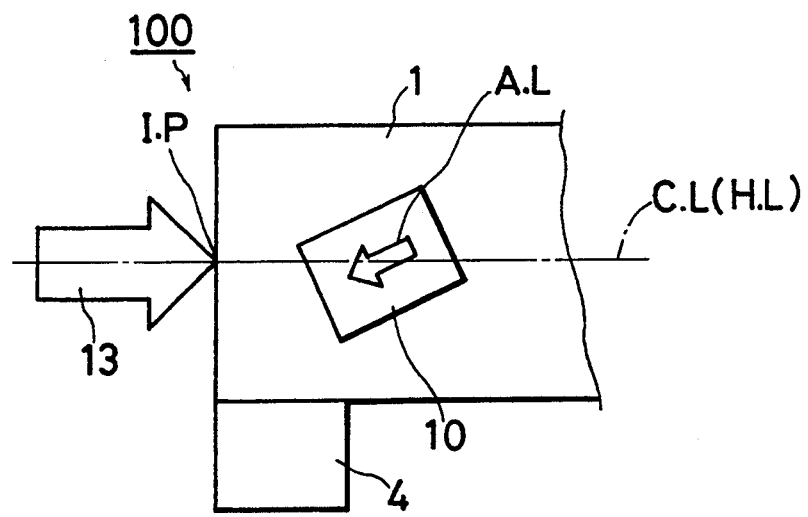
FIG. 13 is a schematic side view showing the front portion of the vehicle body to which a tenth embodiment of the present invention is applied.

Tenth Embodiment (FIG. 13)

For the front portion 100 of the vehicle body in the embodiment, the input point 13 of input of external force from the bumper, i.e. the input point I.P of input of the impact upon the crash, is arranged so as to coincide with the vertically central line C.L of the front frame 1, however, the input point is not offset in either the upward direction or the downward direction, as shown in FIG. 13. To the bottom face of the front end portion of the front frame 1 is joined the cross member 4, thereby allowing the rigidity at the lower portion of the front frame 1 to be set higher relative to that at the upper portion thereof.

Figure 13A:
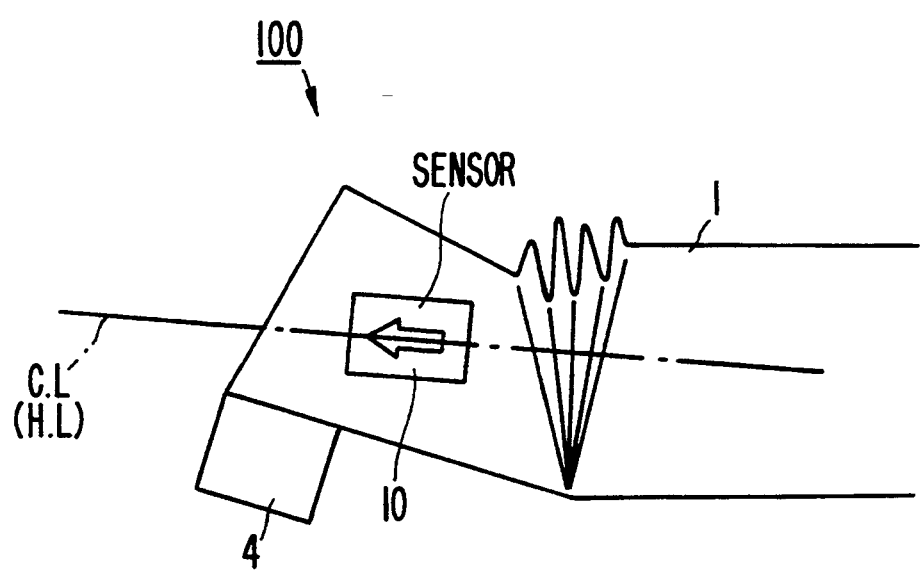
FIG. 13A is a schematic side view showing the front portion of the vehicle in a state of deformation of the front frame at the time of collision.

In this tenth embodiment, the impact sensor 10 is mounted in such a state that it is descending forwards in substantially the same manner as in the first embodiment as described hereinabove. This structure causes the front end portion of the front frame 1 to be curved and deformed in its upward direction in the initial stage of the crash and allows the impact sensor 10 to approach its sensing direction A.L to the horizontal line H.L of the front frame 1 as the front end portion of the front frame 10 is caused to be curved and deformed toward the upward direction, as shown in FIG. 13A.

Like in the first embodiment as described hereinabove, the tenth embodiment may be arranged such that the structure of the front end portion of the front frame 1 is opposite to the structure thereof in the tenth embodiment as described immediately hereinabove. This arrangement causes the front end portion of the front frame 1 to be curved and deformed in its downward direction in the initial stage of the crash, so that the disposition of the impact sensor 10 in the forwards ascending manner is effective for keeping the sensing direction A.L of the impact sensor 10 to a horizontal level in the initial stage of the crash.

Figure 14:
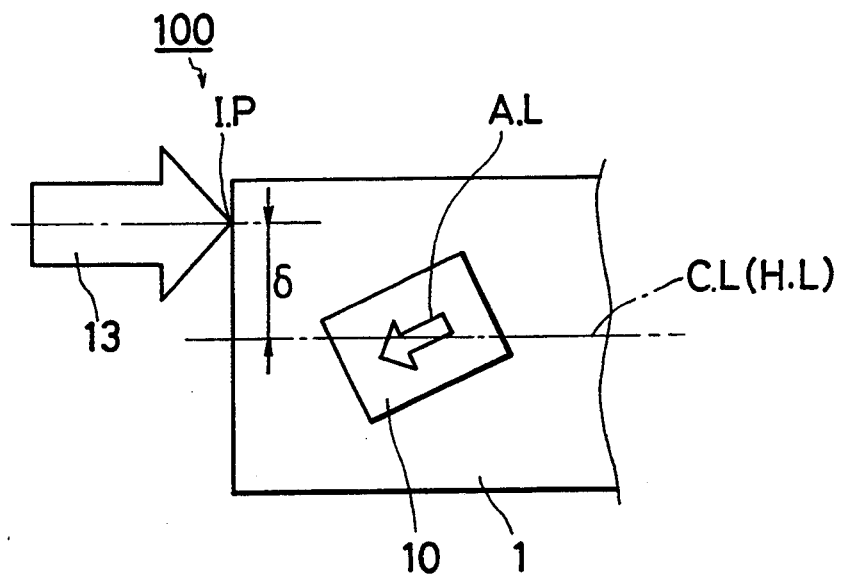
FIG. 14 is a schematic side view showing the front portion of the vehicle body to which an eleventh embodiment of the present invention is applied.

Eleventh Embodiment (FIG. 14)

In this embodiment, too, there is no difference in rigidity between at the upper portion and at the lower portion of the front frame 1 with respect to the central line C.L of the front frame 1, i.e. the rigidity at the upper portion of the front frame 1 is set equal to that at the lower portion thereof. Further, the input point 13 of input of the external force from the bumper, i.e. the input point I.P of input of the impact resulting from the crash, is offset upwards by the distance $\delta$ with respect to the vertically central line C.L of the front frame 1.

In this embodiment, the impact sensor 10 is mounted in such a manner as inclined forwards in substantially the same manner as in the first embodiment as described hereinabove, so that the impact sensor 10 is caused to move so as to allow its sensing direction A.L to approach and coincide with the central line C.L of the front frame 10, i.e. the horizontal line H.L of the vehicle body, due to the curvature of the front frame 1 toward the upward direction in the initial stage of the crash.

This embodiment may be modified in such a manner that the input point of input of the external force from the bumper, i.e. the input point I.P of input of the impact resulting from the crash, is offset downwards by the distance $\delta$ with respect to the central line C.L of the front frame 1 and the impact sensor 10 is mounted in such a manner as ascending forwards. This arrangement can also achieve the effect as in the first part of the eleventh embodiment as described immediately hereinabove.

Figure 15:
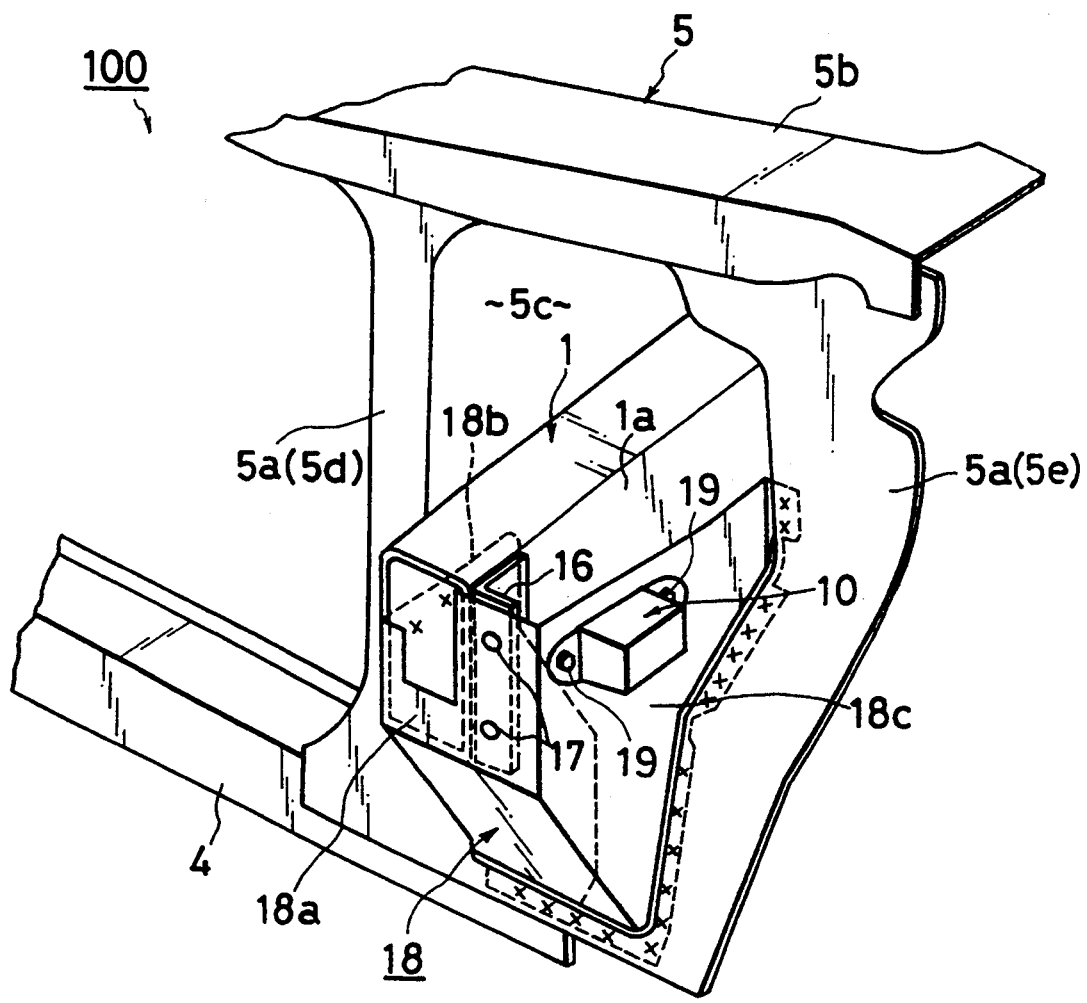
FIG. 15 is a perspective view showing part of the front portion of the vehicle body, when looked at from the obliquely forward position, to which a twelfth embodiment of the present invention is applied.
Figure 16:
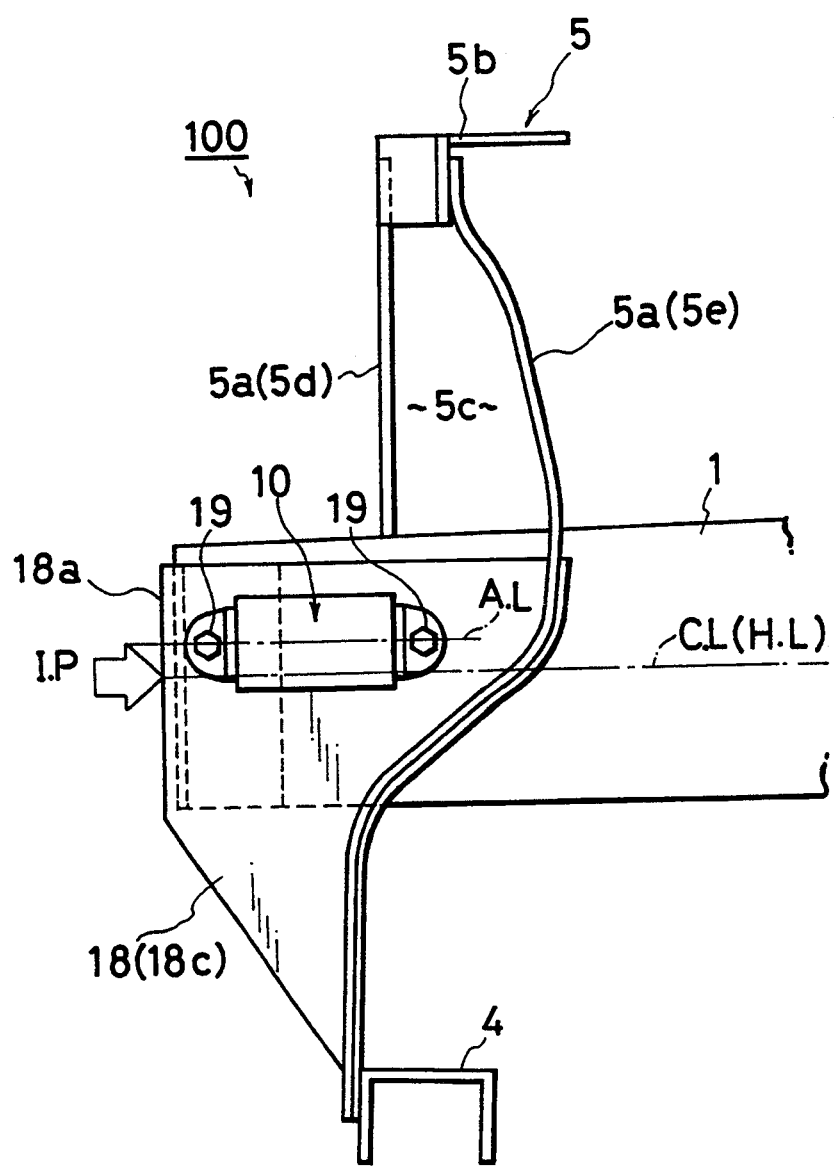
FIG. 16 is a side view showing the front portion of the vehicle body.
Figure 17:
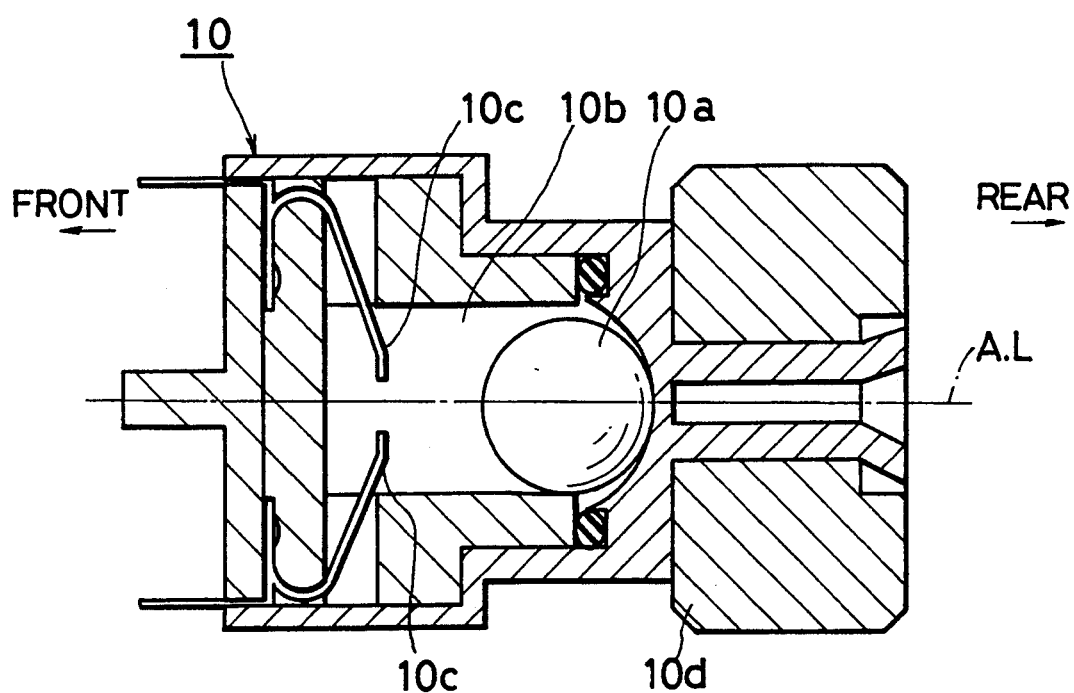
FIG. 17 is a vertical view showing a sensor of a mass damping type as a representative example of the conventional impact sensors.

Twelfth Embodiment (FIGS. 15 & 16)

For the front portion 100 of the vehicle body, a side portion of the shroud panel 5 comprises a shroud side panel 5a and a shroud upper panel 5b joined to an upper end of the shroud side panel 5a. To a lower end of the shroud side panel 5a is joined the cross member 4. The shroud panel 5 and the cross member 4 serve as a member for reinforcing the vehicle body, and a vertically open space 5c is provided between the shroud upper panel 5b and the cross member 4, and the open space 5c is defined additionally by a central section 5d located on the central side of the vehicle body and a side section 5e located on the outer side thereof. The shroud upper panel 5b is in such a shape as its transverse end portion being curved gradually rearward and the shroud side panel 5a is so.arranged that its side section 5e is located in the position behind the central section 5d.

With the arrangement of the shroud panel 5, the front frame 1 is located in the position closer to the central section 5d of the shroud side panel 5a and in a virtually intermediate position of the open space 5c between the cross member and the shroud upper panel 5b. The front end portion of the front frame 1 is so arranged as to pass through the open space 5c and to project in a forward direction.

To an outer front side frame section la of the front end portion of the front frame 1 is connected an L-shaped bracket 16 in a transverse cross-section, which has two holes 17 disposed in a vertically spaced relationship, and the bumper (not shown) is fastened to the L-shaped bracket 16 with bolts through the holes 17.

The front frame 1 is disposed at its front end portion to be integral with the shroud side panel 8a through a connecting panel 18 that in turn is generally formed by press molding, for example, in a nearly square C-letter shape in its transverse cross-section having an opening facing in a rearward direction. In other words, the connecting panel 18 comprises a front end wall section 18a disposed in abutment with the front end face of the front frame 1 and extending in a transverse direction of the vehicle body, an inner wall section 18b extending toward the rearward direction from the end on the central side of the front end wall section 8a to the side face on the inner side of the front frame 1, and an outer side wall section 18c extending toward the rearward direction in a relationship spaced apart from the outer front frame panel la of the front frame 1. Each of the sections 18a to 18c is disposed in such a shape as extending up to the lower end of the shroud side panel 5a.

Further, the connecting panel 18 has a portion of its side wall section 18b connected to the front frame 1 and the rear end of the outer wall section 18c is to connected to the shroud side panel 5a (the side section 5e), while the bottom end of the connecting panel 18 is connected to the bottom end of the shroud side panel 5a. As shown in FIG. 15, the symbol "x" indicates a site for welding.

To the front portion 100 of the vehicle body with the foregoing arrangement, the impact sensor 10 is bolted to the outer wall section 18c of the connecting panel 18 through bolts 19 in such a manner that its sensing direction A.L is disposed as to go along the horizontal line H.L of the vehicle body, as shown in FIG. 16.

With the aforesaid arrangement, the input point I.P of input of the impact of the crash is located in the central line C.L of the front frame 1 and the front end portion of the front frame 1 is crashed and deformed in its axial direction without causing any substantial curvature and deformation in its upward and downward directions due to the disposition of the connecting panel 18 because the shroud panel 5 as a reinforcing member for reinforcing the vehicle body is joined through the connecting panel 18. Accordingly, the impact sensor 10 disposed on the outer side wall section 18c of the connecting panel 18 along and parallel to the horizontal line H.L can maintain its horizontal sensing direction A.L upon the crash.

Furthermore, although not shown in the drawings, the twelfth embodiment according to the present invention may be modified such that the impact sensor 10 may be mounted on the outer front frame section la so as for its sensing direction A.L to agree with the horizontal direction H.L, thereby enabling substantially the same effect as achieved by the first part of the twelfth embodiment according to the present invention as described hereinabove.

The present invention may be embodied in other specific forms without departing from the spirit and scope of the invention. The present embodiments as described hereinabove are therefore to be considered in all respects as illustrative, the scope of the invention being indicated by the appended claims, and all the changes, modifications and variations which come within the meaning and range of equivalency of the claims are therefore intended to be encompassed within the spirit and scope of the invention.

What is claimed is:

1. An impact-sensor mounting structure for an automotive vehicle comprising:

a front frame disposed at a front portion of a vehicle body and extending in a longitudinal direction of the vehicle body, an impact sensor mounted to a front end portion of the front frame, a bumper mounted to the front end portion of the front frame in a position that is located forward of a position in which said impact sensor is mounted, and means for causing deformation of the front frame in a vertical direction at an initial stage of a crash with respect to an input point of an impact load which is transferred to the front frame from the bumper, said means for causing deformation of the front frame in the vertical direction having a cross member connected to the front end portion of the front frame at a location vertically spaced from a portion of the bumper extending in the longitudinal direction of the vehicle body and at a location forward of the position in which said impact sensor is mounted, said impact sensor being mounted to the front frame in a position vertically spaced from the cross member at the front end portion of the front frame, said front frame being so arranged as to be distorted and inclined in the vertical direction on a collision, by mounting the cross member in the location vertically spaced from the bumper and by setting the bumper mount to the front end portion, at the center of the vertical dimension of the front frame, and said impact sensor being mounted to the front frame in an inclined position to a horizontal direction to allow said impact sensor to sense a substantially horizontally directed component of the impact forces of the crash as the front frame is deformed in the vertical direction.

2. An impact-sensor mounting structure as claimed in claim 1, wherein:

the portion of the bumper disposed in the longitudinal direction is located substantially in the center of the vertical dimension of the front frame; and said cross member extends in a transverse direction of the vehicle body.

3. An impact-sensor mounting structure as claimed in claim 1, wherein said cross member is mounted to a bottom surface of the front frame.

4. An impact-sensor mounting structure as claimed in claim 3, wherein said impact sensor is mounted to the front frame in the center of the vertical dimension of the front frame in such a state that a front portion of the impact sensor is inclined downwardly with respect to a horizontal direction of the vehicle body.

* * * * *